(12) United States Patent
Rhett

(10) Patent No.: US 6,247,396 B1
(45) Date of Patent: Jun. 19, 2001

(54) NUTCRACKER WITH ADJUSTING WEDGE MECHANISM

(76) Inventor: Douglas W. Rhett, 1517 Manor Dr., Bartlesville, OK (US) 74006

( * ) Notice: Subject to any disclaimer, the term of this patent is extended or adjusted under 35 U.S.C. 154(b) by 0 days.

(21) Appl. No.: 09/717,671

(22) Filed: Nov. 21, 2000

(51) Int. Cl.$^7$ ........................................................ A23N 5/00
(52) U.S. Cl. ............................. 99/571; 99/572; 99/577; 99/579; 99/581
(58) Field of Search ..................... 99/494, 568, 571–583, 99/600; 30/120.1–120.5; 426/481–483

(56) References Cited

U.S. PATENT DOCUMENTS

| | | | |
|---|---|---|---|
| 1,160,376 | * 11/1915 | Gilson | 99/569 |
| 1,208,324 | * 12/1916 | Canale | 99/572 |
| 1,342,691 | * 6/1920 | Pape | 99/582 X |
| 1,470,247 | * 10/1923 | Wilms | 99/572 |
| 1,901,798 | * 3/1933 | Boomer | 99/586 X |
| 2,067,566 | * 1/1937 | Field | 99/582 |
| 2,635,662 | * 4/1953 | Doering et al. | 99/572 X |
| 2,903,134 | * 9/1959 | Ashlock, Jr. | 99/569 X |
| 3,561,513 | * 2/1971 | Lindsey | 99/571 |
| 3,621,898 | * 11/1971 | Turner | 99/571 |
| 3,871,275 | * 3/1975 | Quantz | 99/571 |
| 4,145,962 | 3/1979 | Coleman et al. | 99/572 |
| 4,255,855 | 3/1981 | Brazil | 30/120.5 |
| 4,370,922 | 2/1983 | Rollband | 99/572 |
| 4,418,617 | * 12/1983 | Quantz | 99/581 X |
| 4,441,414 | * 4/1984 | Quantz | 99/571 |
| 4,466,343 | 8/1984 | Thompson | 99/572 |
| 4,598,475 | 7/1986 | Adams | 30/120.5 |
| 4,665,814 | 5/1987 | Harborne et al. | 99/571 |
| 4,787,307 | 11/1988 | Rollband | 99/572 |
| 5,092,231 | 3/1992 | Smith | 99/572 |

* cited by examiner

Primary Examiner—Timothy F. Simone
(74) Attorney, Agent, or Firm—William R. Sharp

(57) ABSTRACT

A nutcracker is described herein which comprises: a frame; an anvil and hammer movably mounted to the frame; a wedge ramp in a fixed relationship to the frame and having a substantially planar surface; a sliding wedge having opposing, substantially planar surfaces of which one surface is in sliding and flush contact with the surface of the wedge ramp, and the other surface is in contact with the anvil; a striker movably mounted to the frame for striking the hammer; and an anvil and hammer control device for moving the sliding wedge along the wedge ramp while in contact with the anvil so as to move the anvil relative to the hammer from an open position, in which ends of the hammer are at a maximum distance from one another to allow a nut to be received therebetween, to a closed position in which such ends are closed securely upon the nut, whereupon the control device causes the striker to strike the hammer and move it toward the anvil a predetermined distance to thereby crack the nut.

10 Claims, 8 Drawing Sheets

NUTCRACKER WITH ADJUSTING WEDGE MECHANISM

BACKGROUND OF THE INVENTION

The invention relates to a nutcracker, and more particularly to a nutcracker of the type which is capable of adjustment to accommodate nuts of different sizes.

The basic design for adjustable nutcrackers includes an anvil, a hammer, and a mechanism for adjusting the distance between the anvil and hammer. Once this distance is suitably adjusted to securely grip a nut of a particular size between the anvil and hammer, the hammer is forcibly moved toward the anvil to thereby crack the nut. Preferably, the hammer is displaced only a limited, predetermined distance so as to crack the shell of the nut without damaging the kernel therein.

In prior adjustable nutcrackers, the above-mentioned adjusting mechanism is either mechanically complex or requires manual manipulation by the operator that can be tedious and laborious.

SUMMARY OF THE INVENTION

It is, therefore, an object of the invention to provide a nutcracker which is adjustable to accommodate nuts of different sizes.

It is also an object of the invention that such nutcracker is mechanically simple and minimizes manual intervention by the operator.

The invention is a nutcracker comprising: a frame; an anvil having an axis and opposing first and second ends, the anvil being mounted to the frame so as to be movable along the axis; a hammer substantially coaxial with the anvil and having opposing first and second ends which are positioned so that the second end of the hammer faces the second end of the anvil, the hammer being mounted to the frame so as to be movable along the axis; a wedge ramp in a fixed relationship to the frame and having a substantially planar surface, the surface of the wedge ramp defining an acute angle with respect to a line perpendicular to the axis and being positioned relative to the anvil so that the first end of the anvil faces such surface; a sliding wedge having opposing, substantially planar surfaces of which one surface is in sliding and flush contact with the surface of the wedge ramp, and the other surface is substantially perpendicular to the axis and in contact with the first end of the anvil; a striker movably mounted to the frame for striking the first end of the hammer; and an anvil and hammer control means for moving the sliding wedge along the wedge ramp while in contact with the first end of the anvil so as to move the anvil relative to the hammer from an open position, in which the second ends of the anvil and hammer are at a maximum distance from one another to allow a nut to be received therebetween, to a closed position in which the second ends of the anvil and hammer are closed securely upon the nut, whereupon the control means causes the striker to forcibly strike the first end of the hammer and move such hammer toward the anvil a predetermined distance to thereby crack the nut.

Accordingly, the mechanically simple sliding wedge mechanism of the invention operates to adjust the position of the anvil relative to the hammer so as to close securely upon the nut, regardless of its size. According to a preferred embodiment of the invention, the anvil and hammer control means employs a rotatable drag bar that can be rotated by a motor in a mode of operation which only requires the operator to place a nut between the anvil and hammer while in the above-mentioned open position. Even if the drag bar is rotated manually, the sliding wedge is moved to automatically adjust the anvil relative to the hammer to accommodate the size of any particular nut, and the striker is further actuated by the control means to strike the hammer and crack the nut, without any intervention by the operator except for rotation of the drag bar and placement of the nut between the anvil and hammer. This requires no significant effort by the operator or any tedious and time consuming manipulation of an adjustment mechanism.

DESCRIPTION OF A PREFERRED EMBODIMENT

Figure 1:
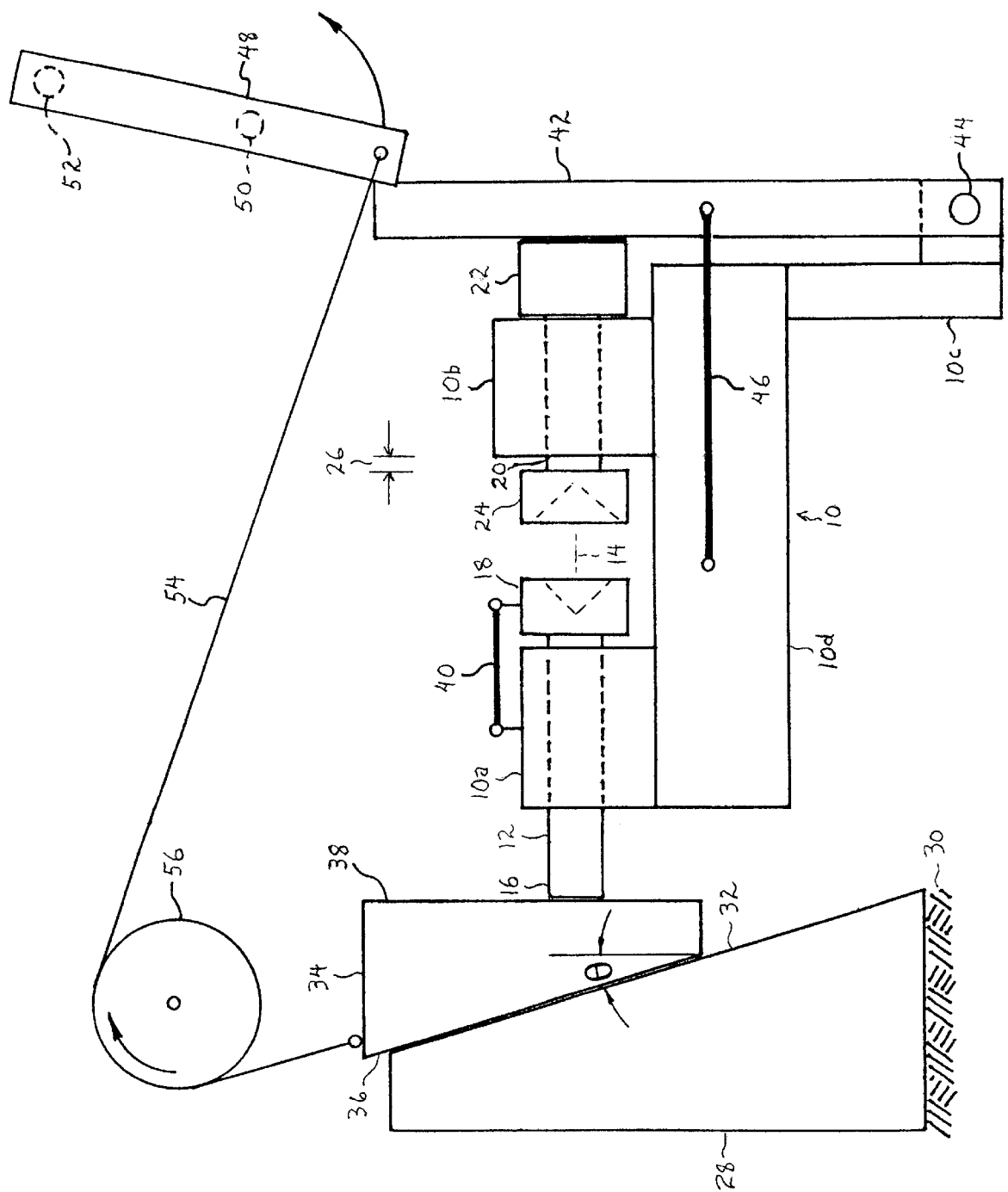
FIGS. 1–7 are diagrammatic illustrations of a preferred embodiment of the invention in various stages of its operation.

Referring to FIG. 1, the illustrated nutcracker includes a frame 10, an anvil 12 having a horizontally oriented axis 14 and opposing ends 16 and 18, and a hammer 20 substantially coaxial with anvil 12 and having opposing ends 22 and 24 which are positioned so that end 24 of hammer 20 faces end 18 of anvil 12. Anvil 12 is slidably mounted within frame portion 10a so as to be movable along axis 14, and hammer 20 is slidably mounted within frame portion 10b so as to also be movable along axis 14. The portions of anvil 12 and hammer 20 received within respective frame portions 10a and 10b are represented by broken lines. As shown, anvil end 18 and hammer end 24 are enlarged and in the form of nut cups having generally conical recesses (indicated by broken lines) for securely holding opposing ends of a nut, as will be apparent from subsequent FIGURES. Hammer end 22 is also enlarged and has an inner face abutting frame portion 10b in this stage of operation. A gap exists between hammer end 24 and frame portion 10b which is hereafter referred to as the "hammer gap", a distance indicated at 26.

A wedge ramp 28 is mounted on a suitable foundational support 30 so as to be in a fixed relationship to frame 10. wedge ramp 28 has a substantially planar surface 32 positioned relative to anvil 12 so that anvil end 16 faces such surface. As shown, surface 32 defines an acute angle θ with respect to a line perpendicular to axis 14. In the illustrated embodiment, wedge ramp 28 is vertically oriented and has upper and lower ends such that surface 32 slopes from the lower end to the upper end in a direction away from anvil 12.

A sliding wedge 34 has opposing, substantially planar surfaces 36 and 38, of which surface 36 is in sliding and flush contact with surface 32 of wedge ramp 28, and surface 38 is substantially perpendicular to axis 14 and in contact with anvil end 16. A resilient member 40, such as a spring, is connected between frame portion 10a and anvil end 18 to thereby bias anvil 12 toward sliding wedge 34 and maintain contact between anvil end 16 and surface 38 of the sliding wedge.

A striker 42 has a lower end pivotally mounted to frame portion 10c at 44. A resilient member 46, such as a spring, is connected between frame portion 10d and striker 42 to thereby bias the striker toward hammer 20. As shown in the stage of operation of FIG. 1, striker 42 is in contact with the outer face of hammer end 22.

A drag bar 48 is rotatable in a counterclockwise direction (as indicated by the arrow) by means of a drive shaft 50.

Drag bar 48 also has a drag pin 52 extending from one end thereof. Drive shaft 50 and drag pin 52 are indicated by broken lines because they extend from the opposing side of drag bar 48 not visible in this view. (but more clearly shown in a subsequent FIGURE). A draw line 54 extends between and is fixedly connected to the upper end of sliding wedge 34 and the end of drag bar 48 opposite drag pin 52. Draw line 54 passes over a pulley 56 that is positioned above the upper end of sliding wedge 34, thereby supporting the weight of the sliding wedge.

Figure 2:
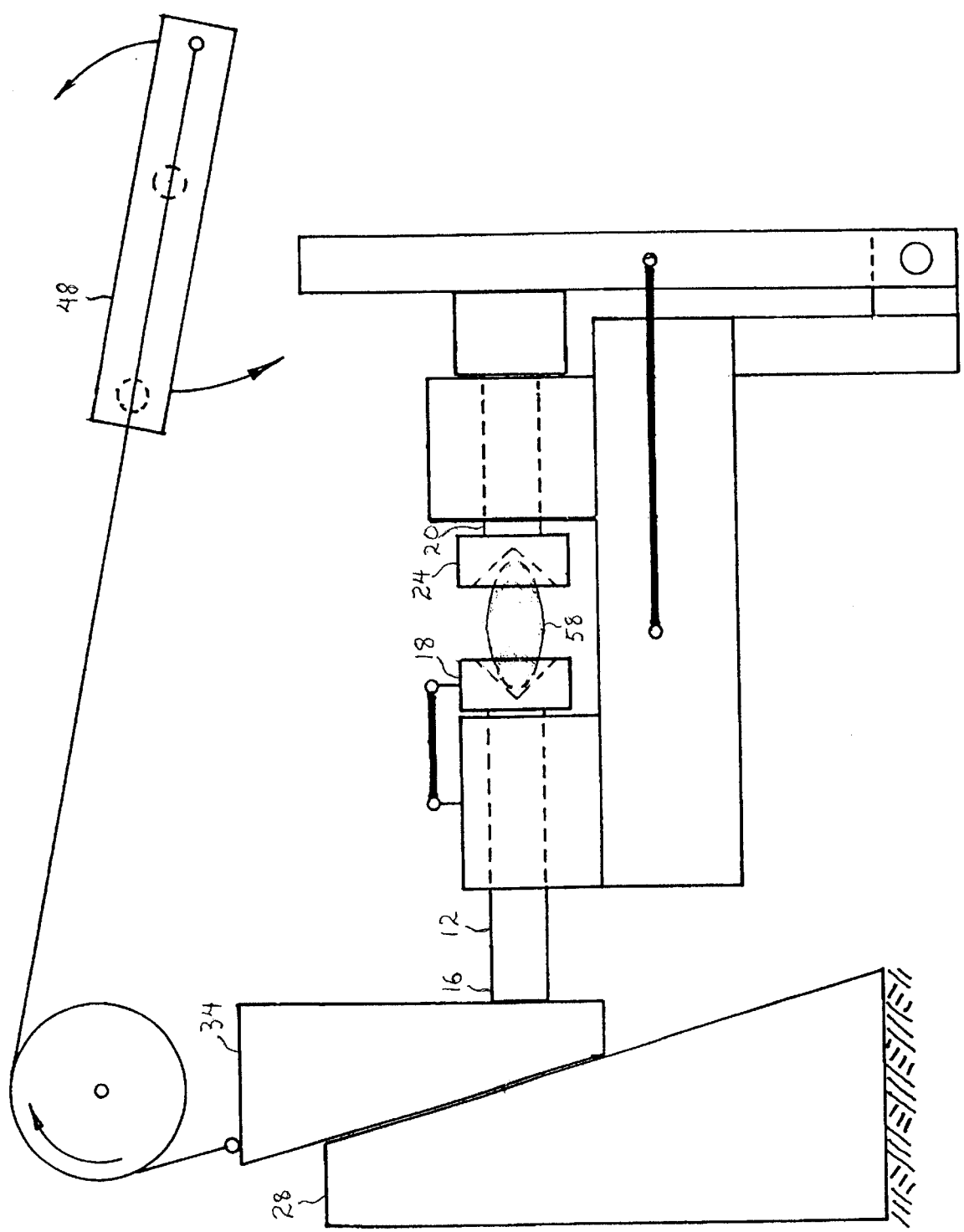

Referring to FIG. 2, rotation of drag bar 48 to the illustrated position raises sliding wedge 34 along wedge ramp 28 to its uppermost position while in contact with anvil end 16. consequently, anvil 12 is in its most retracted position to thereby place the anvil relative to hammer 20 in what is referred to herein as the "open" position, in which anvil end 18 and hammer end 24 are at a maximum distance from one another to allow a nut 58 to be received therebetween.

Figure 3:
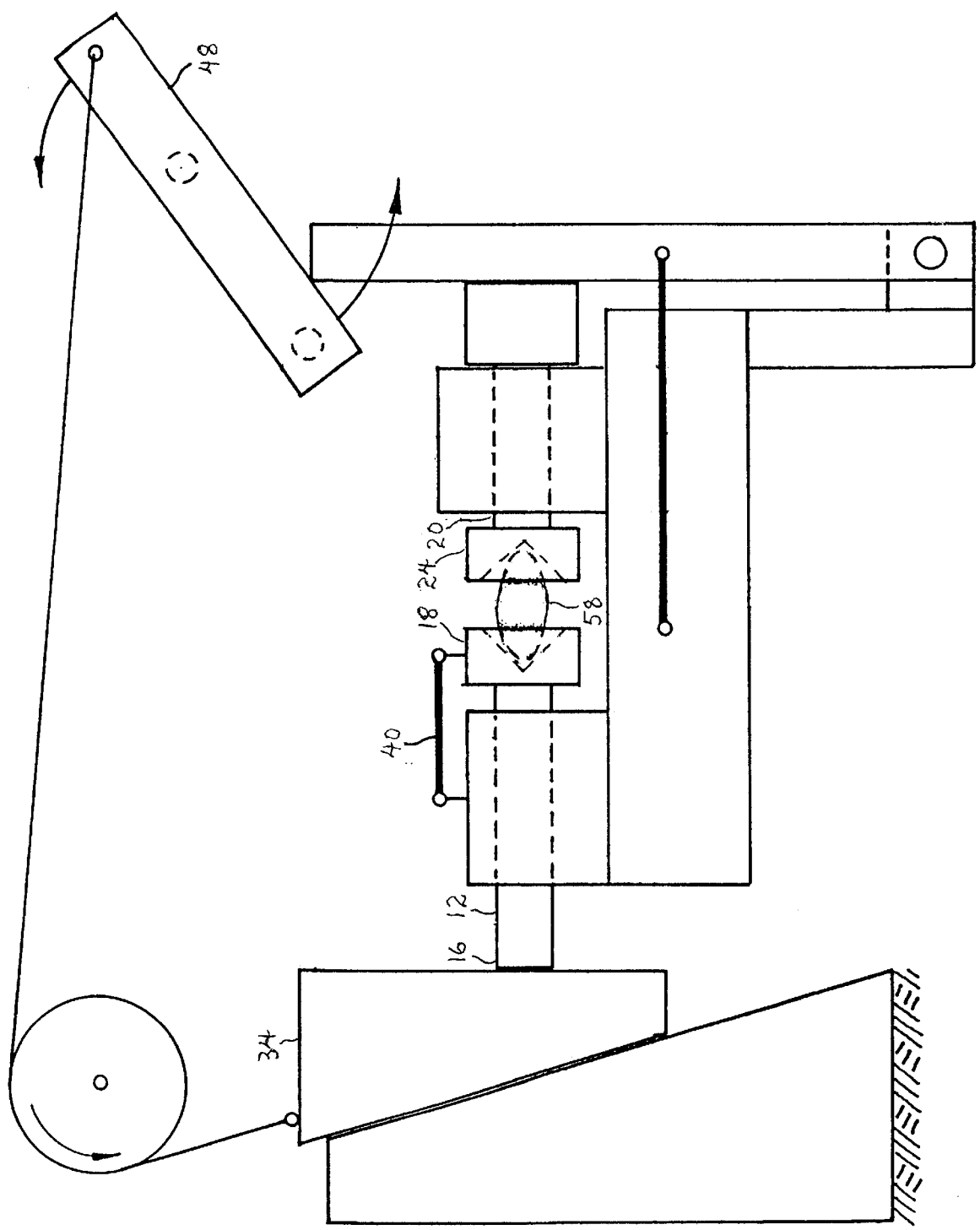

Referring to FIG. 3, further rotation of drag bar 48 to the illustrated position lowers sliding wedge 34 to thereby move anvil 12 relative to hammer 20 from the above-mentioned open position to a "closed" position. In such closed position, anvil end 18 and hammer end 24 are closed securely upon nut 58. As should be apparent, the weight of sliding wedge 34 is such that lowering of the sliding wedge as in contact with anvil end 16 exerts a force upon anvil 12 which exceeds the resistance of resilient member 40.

Figure 4:
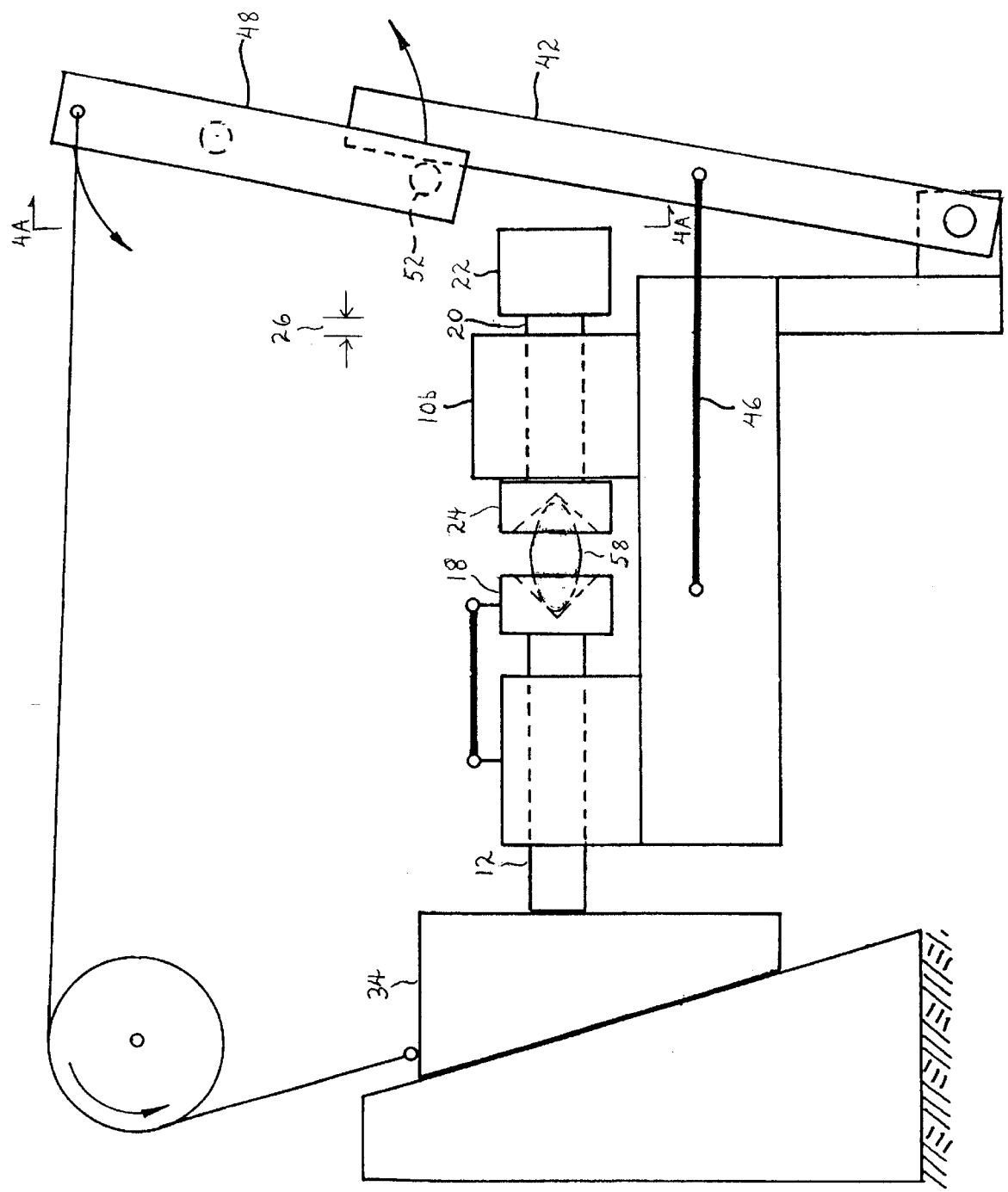

Referring to FIG. 4, after continued rotation of drag bar 48, drag pin 52 engages striker 42 so as to pivot the striker away from hammer 20 against the strong resistance of resilient member 46. At the same time, sliding wedge 34 is further lowered to move both anvil 12 and hammer 20 to thereby place hammer end 24 in contact with frame portion 10b, with anvil end 18 and hammer end 24 remaining closed upon nut 58. The hammer gap 26 is, therefore, now defined between the inner face of hammer end 22 and frame portion 10b.

Figure 4A:
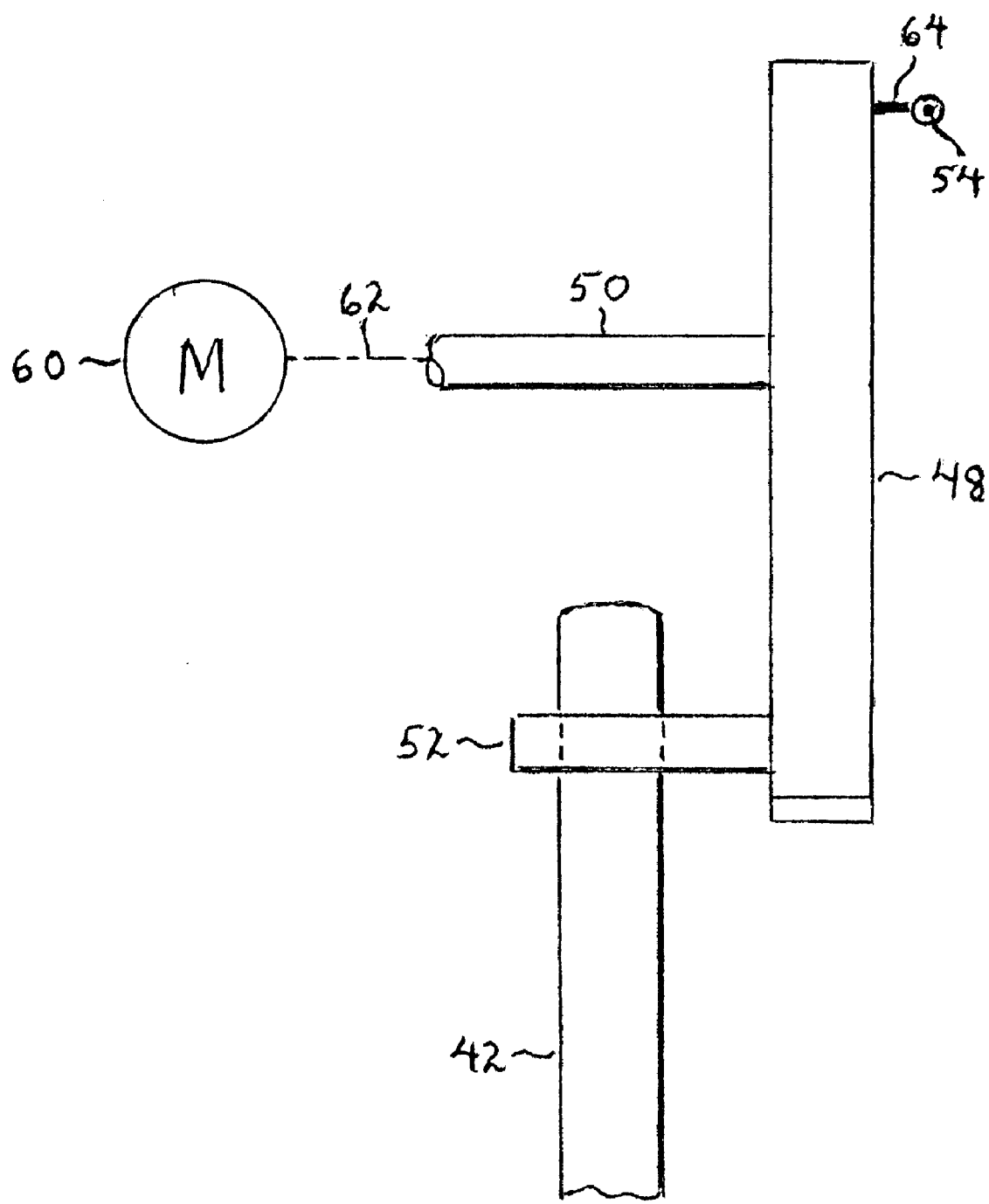
FIG. 4A is a view of a portion of the nutcracker shown in FIG. 4 as viewed along line 4A—4A.

Referring to FIG. 4A, this view more clearly shows the manner in which drive shaft 50 and drag pin 52 extend from one side of drag bar 48. Drive shaft 50 and drag pin 52 can be fixedly connected to drag bar 48 by any suitable means. As schematically indicated, a motor 60 is provided in the illustrated embodiment for rotating drag bar 48 by means of a mechanical link 62 to drive shaft 50. Drag pin 52 extends outwardly from drag bar 48 a sufficient distance to engage striker 42. Draw line 54 is connected to one end of drag bar 48 by a suitable connector 64. striker 42 is shown as being generally cylindrical, and drag bar 48 is shaped to have a rectangular cross section, although the striker and drag bar can take other forms that function equally well.

Figure 5:
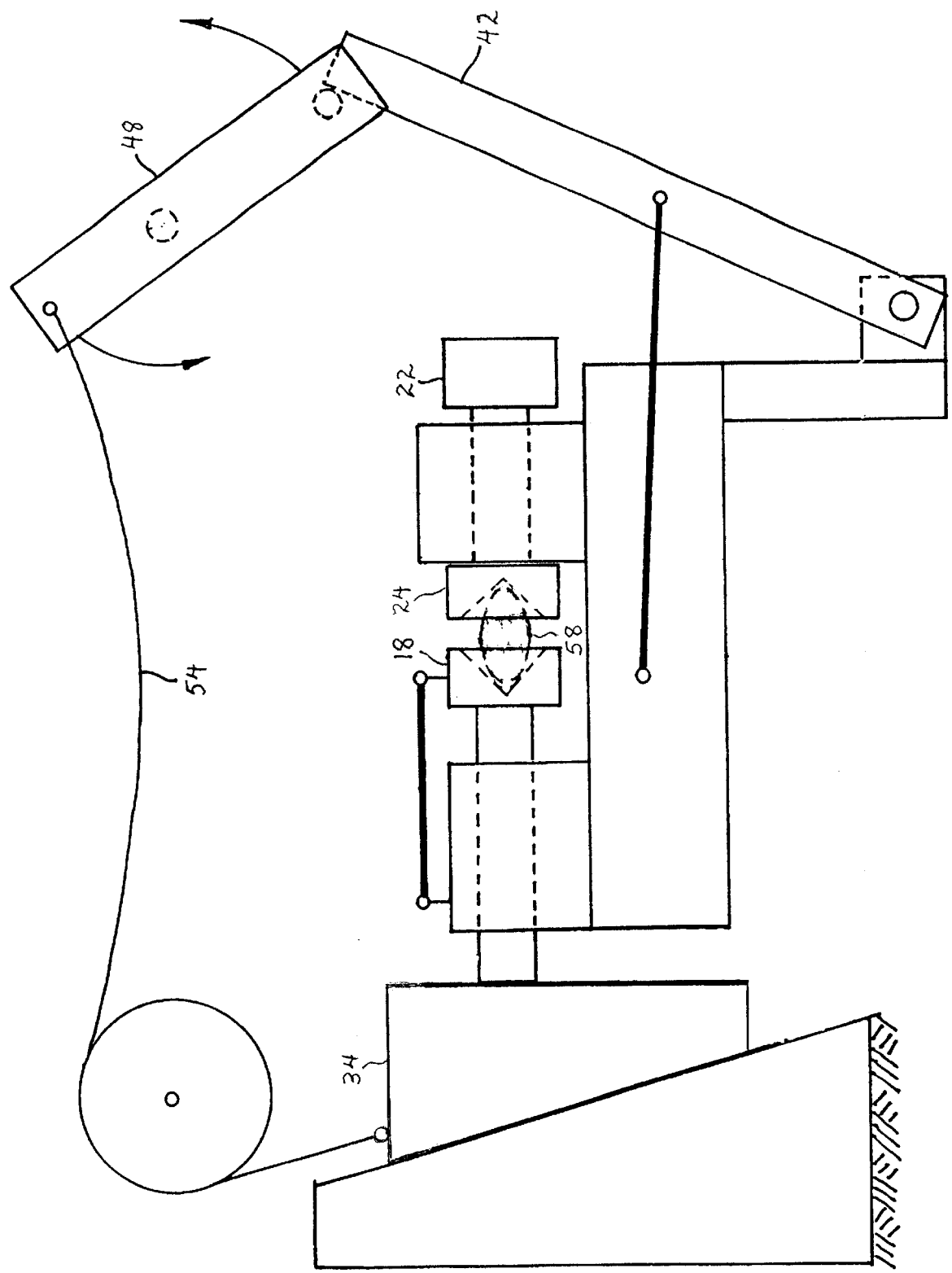

Referring to FIG. 5, further rotation of drag bar 48 pivots striker 42 to its maximum distance from hammer end 22. As shown, draw line 54 no longer supports the weight of sliding wedge 34. The weight of sliding wedge 34 maintains anvil end 18 and hammer end 24 closed upon nut 58 in the same manner shown in FIG. 4.

Figure 6:
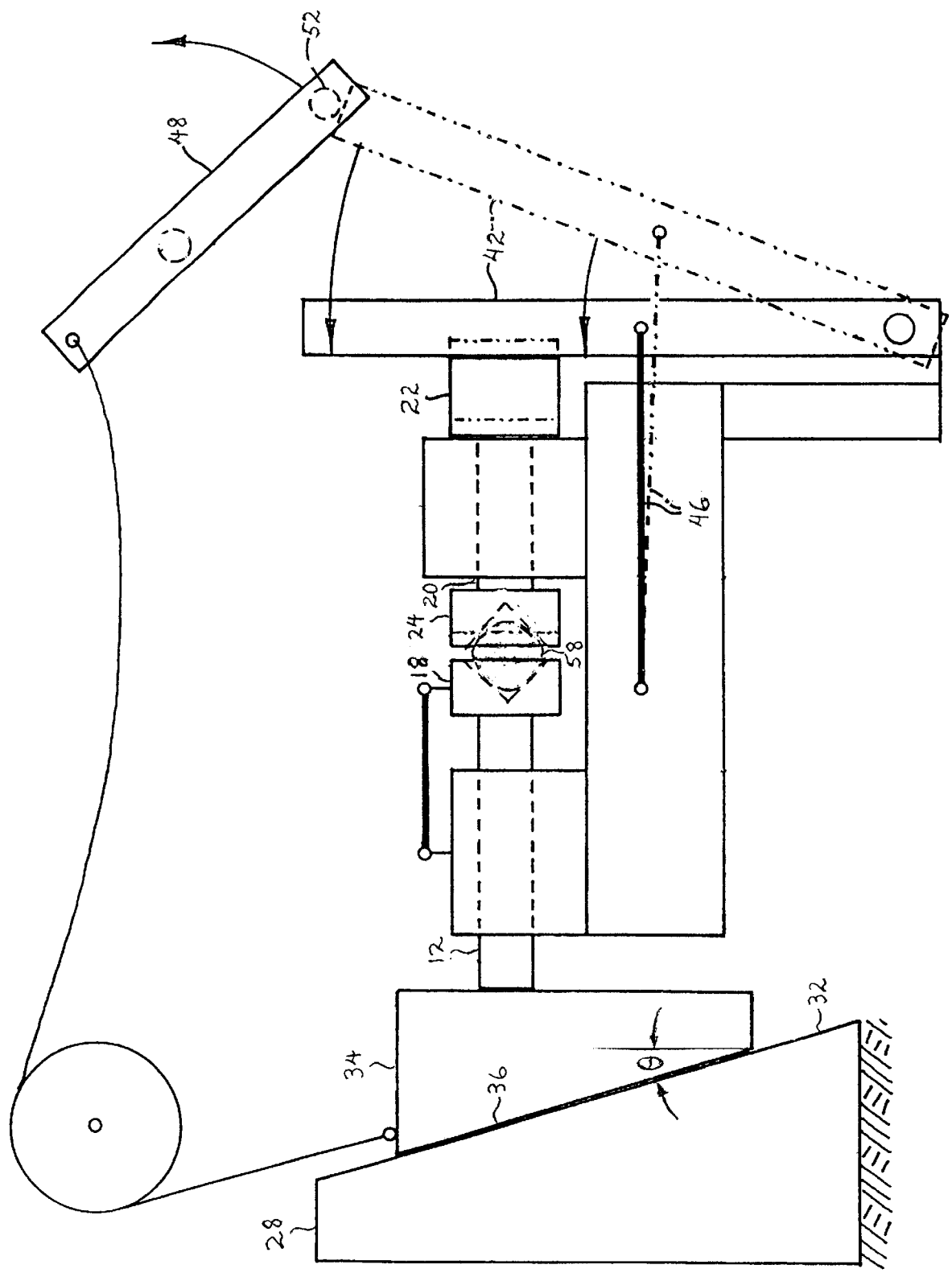

Referring to FIG. 6, slight additional rotation of drag bar 48 disengages drag pin 52 from striker 42 to thereby release the striker. Consequently, resilient member 46 pulls striker 42 from the position shown in phantom lines to the position shown in solid lines so as to forcibly strike the outer face of hammer end 22. This results in rapid movement of hammer 20 toward anvil 12 (as represented by phantom and solid lines) the small distance of the above-mentioned hammer gap. The shell of nut 58 is compressed and shattered between anvil end 18 and hammer end 24, while causing little or no damage to the kernel therein because of the limited displacement of hammer 20. of course, wedge 34 should not be so heavy as to impart a force upon anvil 12 which would damage the kernel after cracking of the shell. Angle θ (defined above with reference to FIG. 1), surface 32 of wedge ramp 28, and surface 36 of sliding wedge 34 are such that striking of hammer end 22 by striker 42 does not result in movement of the sliding wedge relative to the wedge ramp. In other words, for the force imparted to anvil 12 and sliding wedge 34, angle θ is preferably less than the angle of static friction (that angle at which upward motion of the sliding wedge along wedge ramp 28 becomes impending). Most preferably, tan θ is less than the coefficient of static friction for the contacting surfaces 32 and 36. This will ensure that sliding wedge 34 will remain fixed relative to wedge ramp 28 regardless of the force imparted to the sliding wedge.

Figure 7:
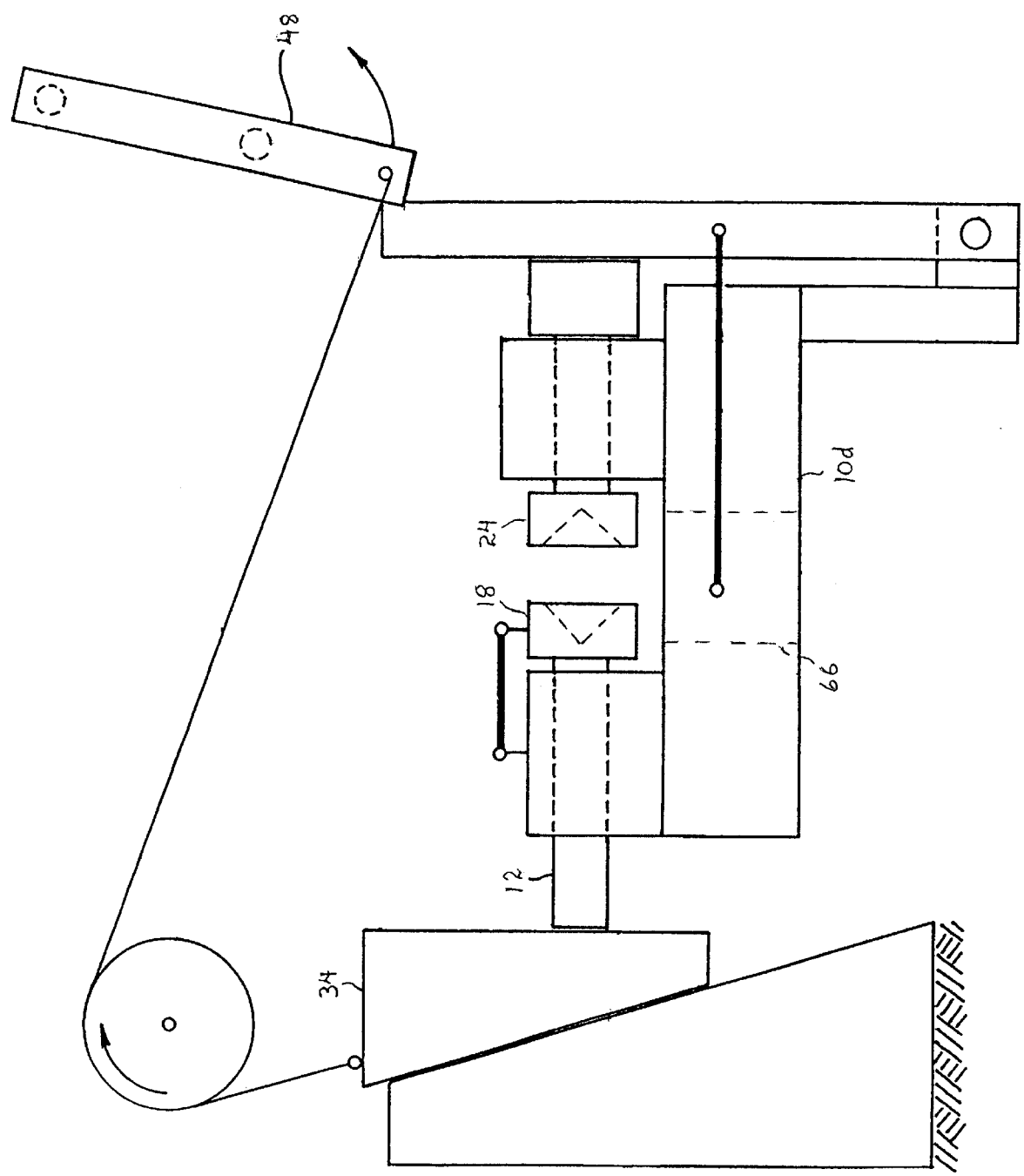

Referring to FIG. 7, continued rotation of drag bar 48 raises sliding wedge 34 to the position shown, causing anvil 12 to retract and thereby increase the distance between anvil end 18 and hammer end 24. This allows the cracked nut (not shown), including fragments of the shell and the undamaged kernel, to fall through a suitable opening in frame portion 10d, as indicated by broken lines at 66. The cracked nut can received by a suitable container (not shown).

The various stages of operation discussed above are repeated to crack additional nuts. A variable speed electric motor 60 (FIG. 4A) permits an operator to crack nuts as fast as the operator chooses to feed them into the nutcracker. The motor is most conveniently set at 20–30 RPM. The operator is only required to insert a nut between anvil end 18 and hammer end 24 in the stage of operation shown in FIG. 2.

With regard to preferred details of construction, the wedge ramp and sliding wedge can be composed of any suitably sturdy and hard materials, including various metals or even a hard wood. The wedge ramp and sliding wedge can be made of the same material or different materials, of course, angle θ will vary somewhat depending upon the materials and surface textures of the wedge ramp and sliding wedge, as should be apparent from the discussion of FIG. 6. In general, however, angle θ will be in the range of 10–30°. The hammer and striker are preferably comprised of steel for optimum sturdiness and durability. The frame, drag bar, and anvil can be constructed of any suitably strong materials, preferably a light metal such as aluminum.

Obviously, many modifications and variations of the present invention are possible in light of the above teachings. For example, as previously mentioned, the drag bar could be rotated manually rather than by a motor. Foot pedals could be operably connected to the drive shaft with a suitable drive mechanism, or a crank could be connected to the drive shaft for operation by hand. According to another possible variation, the wedge ramp and sliding wedge could be oriented horizontally, with that surface of the sliding wedge contacting the anvil still being perpendicular to the axis of the anvil; in which case a spring or other resilient member would be required to bias the sliding wedge along the wedge ramp instead of relying on the weight of the sliding wedge as in the illustrated embodiment. It is, therefore, to be understood that within the scope of the appended claims, the invention can be practiced otherwise than as specifically described.

That which is claimed is:

1. A nutcracker comprising:

a frame;

an anvil having an axis and opposing first and second ends, the anvil being mounted to the frame so as to be movable along said axis;

a hammer substantially coaxial with the anvil and having opposing first and second ends which are positioned so that the second end of the hammer faces the second end of the anvil, the hammer being mounted to the frame so as to be movable along said axis;

a wedge ramp in a fixed relationship to the frame and having a substantially planar surface, the surface of the wedge ramp defining an acute angle with respect to a line perpendicular to said axis and being positioned relative to the anvil so that the first end of the anvil faces such surface;

a sliding wedge having opposing, substantially planar surfaces of which one surface is in sliding and flush contact with the surface of the wedge ramp, and the other surface is substantially perpendicular to said axis and in contact with the first end of the anvil;

a striker movably mounted to the frame for striking the first end of the hammer; and an anvil and hammer control means for moving the sliding wedge along the wedge ramp while in contact with the first end of the anvil so as to move the anvil relative to the hammer from an open position, in which the second ends of the anvil and hammer are at a maximum distance from one another to allow a nut to be received therebetween, to a closed position in which the second ends of the anvil and hammer are closed securely upon the nut, whereupon said control means causes the striker to forcibly strike the first end of the hammer and move such hammer toward the anvil a predetermined distance to thereby crack the nut.

2. A nutcracker as recited in claim 1 wherein the second ends of the anvil and hammer are in the form of nut cups for securely holding opposing ends of the nut.

3. A nutcracker as recited in claim 2 wherein said acute angle, the surface of the wedge ramp, and said one surface of the sliding wedge are such that striking of the first end of the hammer by the striker does not result in movement of the sliding wedge relative to the wedge ramp.

4. A nutcracker as recited in claim 3 wherein the wedge ramp is vertically oriented and has upper and lower ends such that the surface of the wedge ramp slopes from the lower end to the upper end in a direction away from the anvil, and wherein said axis is horizontally oriented.

5. A nutcracker as recited in claim 4 wherein the striker is pivotally mounted to the frame.

6. A nutcracker as recited in claim 5 further comprising a first biasing means for biasing the striker toward the hammer, and wherein the control means moves the striker away from the hammer and releases the striker so as to strike the first end of the hammer.

7. A nutcracker as recited in claim 6 wherein the sliding wedge and striker have respective upper ends, and wherein the anvil and hammer control means includes: a rotatable drag bar having opposing ends and a drag pin extending from one end thereof for engaging the upper end of the striker to move the striker away from the hammer in response to rotation of the drag bar, disengagement of the drag pin from the striker resulting in release of the striker; a pulley positioned above the upper end of the sliding wedge; and a draw line extending between and fixedly connected to the upper end of the sliding wedge and the other end of the drag bar, the draw line passing over the pulley to support the weight of the sliding wedge so that rotation of the drag bar lowers the sliding wedge to move the anvil relative to the hammer from said open position to said closed position.

8. A nutcracker as recited in claim 7 further comprising a second biasing means for biasing the anvil toward the sliding wedge.

9. A nutcracker as recited in claim 8 wherein the first biasing means comprises a resilient member connected between the frame and the striker, and the second biasing means comprises a resilient member connected between the frame and the second end of the anvil.

10. A nutcracker as recited in claim 9 further comprising a motor for rotating the drag bar.

* * * * *